United States Patent Office 2,840,600
Patented June 24, 1958

2,840,600

N-SUBSTITUTED TRIMETHYLENE DIAMINE-N'ALKANOIC ACIDS, SALTS, AND ESTERS

Paul L. Du Brow and Frederick W. Smith, Chicago, Ill., assignors to Armour and Company, Chicago, Ill., a corporation of Illinois No Drawing. Application February 2, 1955
Serial No. 485,801

16 Claims. (Cl. 260—501)

This invention relates to a novel and useful family of chemical compounds, the primary members of which can be described as N-substituted trimethylene diamine-N'-alkanoic acids.

The primary or acid members of the present family of compounds can be represented by the general formula $RNHCH_2CH_2CH_2NH-A-COOH$, wherein A is a divalent hydrocarbon radical having from 2 to 3 carbon atoms and R is a radical of the group consisting of (A) aliphatic hydrocarbon radicals having from 8 to 22 carbon atoms, and (B) hydrocarbon radicals as derived from rosin and tall oil acids. Examples of radicals coming within the definition of R include octyl, nonyl, decyl, undecyl, dodecyl, tridecyl, tetradecyl, pentadecyl, hexadecyl, heptadecyl, octadecyl, eicosyl, docosyl, octadecenyl, octadecadienyl, octadecatrienyl, mixtures of the foregoing radicals as derived from tallow, soybean oil, coconut oil, and other animal and vegetable oil acids, and hydrocarbon radicals as derived from the acids of rosin and tall oil, such as abietic acid, dehydroabietic acid, dihydroabietic acid, and tetrahydroabietic acid.

One method for preparing the above primary compounds involves reacting an N-substituted trimethylene diamine with a lower unsaturated acid, such as acrylic acid, methacrylic, crotonic acid, and methyl crotonic acid. The reaction between the N-substituted trimethylene diamine and an unsaturated acid, such as crotonic acid, can be illustrated as follows:

$RNH(CH_2)_3NH_2 + CH_3CH=CHCOOH \rightarrow RNH(CH_2)_3NHCH(CH_3)CH_2COOH$

It will be seen from the foregoing equation that the reaction is essentially an addition reaction, the primary amine group of the N-substituted trimethylene diamine adding across the double bond of the acid. The reaction is generally carried out in the presence of a solvent, such as water, n-propyl alcohol, hexylene glycol, etc., and at the temperature of the refluxing reaction mixture. Under these conditions the secondary amine group of the diamine is not affected. The time required to complete the reaction is in the range of about 20 to 48 hours.

When preparing the primary compounds according to the foregoing equation, the preferred diamines are N-aliphatic trimethylene diamines sold by Armour and Company under the trade name Duomeen. The preferred unsaturated acid is crotonic acid. However, other lower unsaturated acids, or their lower alkyl esters, or their salts, can be employed. In the latter instances, hydrolysis to the acid is necessary.

Another method for preparing the primary compounds involves reacting a lactone with the N-substituted trimethylene diamine. This reaction can be illustrated by the following equation:

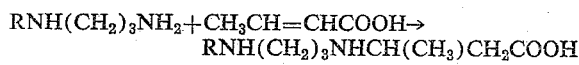

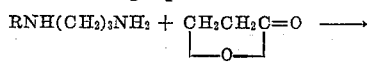 

This reaction is usually carried out at low temperatures, viz., 30–40° C., and in the presence of a suitable solvent, such as acetonitrile.

Also within the scope of the present invention are the alkali metal and alkaline earth metal salts of the primary compounds as hereinbefore described. These include the potassium, lithium, sodium, calcium and magnesium salts of the primary compounds. These salts can be prepared by reacting the primary compound with the appropriate base, such as sodium hydroxide, potassium hydroxide, lithium hydroxide, calcium hydroxide, magnesium carbonate, etc. The preferred metal salts are the sodium and calcium derivatives.

Also within the scope of the present invention are the amine salts of the primary compounds, and include the monoamine and diamine salts, wherein the monoamine is either primary, secondary, or tertiary and of the formulae $RNH_2$, $R_2NH$ and $R_3N$, and the diamine is of the formula $R'NH(CH_2)_nNH_2$, wherein R can be aliphatic hydrocarbon radicals having from 1 to 22 carbon atoms, or a hydrocarbon radical as derived from rosin or tall oil acids, R' can be any aliphatic hydrocarbon radical having from 8 to 22 carbon atoms or a hydrocarbon radical as derived from rosin or tall oil acids, and $n$ is an integer of from 2 to 5. Examples of the higher aliphatic hydrocarbon and rosinyl radicals within the foregoing definition are the same as hereinbefore mentioned. Examples of lower hydrocarbon radicals include methyl, ethyl, propyl, isopropyl, butyl, isobutyl, pentyl, etc. The preferred monoamine salts are salts of the primary compounds and secondary amines, such as di-n-butyl amine and di-coco amine. The preferred diamine salts are salts of the primary compounds and N-aliphatic trimethylene diamines. The amine salts, generally, can be made by mixing equimolar quantities of the primary compound and the desired amine, and heating slightly, if necessary.

Other members of the family of compounds within the scope of the present invention include the lower alkyl esters of the primary compounds, such as the methyl ester, the ethyl ester, the propyl ester, the isopropyl ester, the butyl ester, and the isobutyl ester. These compounds can be prepared by reacting the appropriate lower alcohol with the basic compound. Alternatively, the esters can be prepared by reacting the N-substituted alkylene diamine with the appropriate ester of an unsaturated acid, as described in connection with the preparation of the primary compound.

The compounds of the family herein described have been found to be effective as corrosion inhibitors, and also excellent fuel oil additives. This latter use is described and claimed in the copending application of Marsh et al., filed February 2, 1955, Serial No. 485,802.

The following examples will help to illustrate the underlying principles of our invention, and are not intended to be unduly limiting thereof.

Example I 320 parts by weight of N-coco trimethylene diamine, 86 parts by weight of crotonic acid and 150 parts by weight of water were mixed and refluxed for 24 hours. The conversion to the compound having the formula $RNH(CH_2)_3NHCH(CH_3)CH_2COOH$ was substantially complete. To the reaction mixture, 40 parts by weight of sodium hydroxide and 40 parts of water were added. The resulting mixture contained approximately 60% by weight of the sodium salt of the before-mentioned compound.

Example II 370 parts by weight of N-tallow trimethylene diamine, 86 parts by weight of crotonic acid, 175 parts of hexylene glycol and 175 parts of water were heated to reflux for 48 hours. The reaction mixture contained approximately 50 weight percent of a compound represented by the formula $RNH(CH_2)_3NHCH(CH_3)CH_2COOH$ wherein R is a mixture of radicals as derived from tallow acids.

Example III

To 50 parts by weight of the compound prepared in Example II was added 9.5 parts by weight of tributyl amine. The resulting solution of the tributyl amine salt of the primary acid was approximately 58% active and exhibited good sludge inhibiting characteristics when added to fuel oils.

Example IV

To 80 parts by weight of the compound prepared in Example II was added 4 parts by weight of sodium hydroxide in 4 parts of water. The resulting sodium salt was both water-soluble and oil-soluble and had both color stabilizing and sludge inhibiting characteristics when added to fuel oils.

Example V 80 parts by weight of the compound prepared in Example II was neutralized with 3.7 parts by weight of calcium hydroxide, employing heat to effect complete reaction. The calcium salt slurry thus obtained was liquid at room temperature and exhibited excellent color stabilizing and sludge inhibiting characteristics when added to fuel oils. The compound was water-insoluble.

Example VI 80 parts by weight of the compound prepared in Example II were neutralized with 42 parts by weight of magnesium carbonate. The magnesium salt in contrast to the calcium salt was water-soluble.

Example VII 400 parts by weight of N-soya trimethylene diamine, 86 parts by weight of crotonic acid, 175 parts by weight of water and about 140 parts by weight of n-propanol were refluxed for 48 hours. The resulting solution contained about 50 weight percent of a compound having the formula $RNH(CH_2)_3NHCH(CH_3)CH_2COOH$ wherein R is a mixture of radicals as derived from soybean acids.

Example VIII 370 gms. of N-tallow trimethylene diamine was added dropwise to a violently stirred solution of 74 gms. of beta-propiolactone in 1000 cc. of acetonitrile. The temperature was maintained around 35° C. and allowed to rise no higher than 40° C. After addition of the diamine was completed, the mixture was allowed to stand 1 hour with occasional stirring. The resulting compound, represented by the formula $$RNH(CH_2)_3NHCH_2CH_2COOH$$

wherein R is a mixture of radicals as derived from tallow acids, was a thick liquid at 35° C. and the mixture was separated from the acetonitrile in separatory funnel, warmed to 35° C. Last traces of acetonitrile were removed under reduced pressure.

Example IX

To 80 parts by weight of the compound prepared in Example II was added 129 parts by weight of di-n-butyl amine. The resulting salt showed excellent color stabilization, sludge inhibition and corrosion inhibition characteristics when added to fuel oil.

Example X 80 parts by weight of the compound prepared in Example II was neutralized with 37 parts by weight of N-tallow trimethylene diamine. The product showed excellent color stabilizing, sludge inhibiting, and corrosion inhibiting characteristics when added to fuel oils.

Example XI

Two samples of a domestic fuel oil comprised of a 50–50 blend of straight run and catalytically cracked distillates, one sample containing additionally 50 parts per million of a compound having a formula $$RNHCH_2CH_2CH_2NHCH(CH_3)CH_2COOH$$

wherein R is a mixture of radicals derived from soybean acids, were subjected to ultra-violet irradiation in an open vessel for 7 hours using nitrogen for agitation. The temperature of the oil during the irradiation treatment was about 115° F. The samples were then allowed to stand protected from light at room temperature for approximately 17 hours after which time the filterability and quantity of insoluble sludge were determined. The filterability was determined by measuring the time required to filter 100 cc. of the oil through 10-micron filter paper, maintaining a constant head of liquid during the filtration. The control sample had a filterability of 585 seconds/100 cc. The test sample had a filterability of 290 seconds/100 cc.

The quantity of insoluble sludge was determined by filtering a measured quantity of the oil through a sintered-glass crucible, rinsing the crucible free of fuel oil with filtered mineral spirits, drying the crucible to constant weight at 240° F. and determining the increase in weight of the crucible. The control sample contained 64.5 mg. of insoluble sludge per liter of oil. The test sample contained 3.5 mg. of insoluble sludge per liter of oil.

The emulsification characteristics of the test sample were determined by putting 20 cc. of distilled water and 80 cc. of the oil containing the additive in a graduated cylinder, stoppering the same and inverting it about 15 times to form an emulsion, and measuring the time necessary for the emulsion to break to a 2 cc. interface. An oil is acceptable in this respect if the time required is less than 4½ minutes, and good if the time is between 1½ and 2½ minutes. The present test sample demonstrated good emulsification properties.

These samples were further tested by subjecting the same to a temperature of 150 to 180° F., invented containers, for a period of 72 hours, observing visually the sludge formation, and determining a final NPA color. The control sample had an initial (before heating) NPA color of 1+, a final NPA color of 4, and exhibited heavy sludge formation. The test sample had an initial NPA color of 1+, a final NPA color of 2½, and exhibited only very slight sludge formation.

Example XII

Two samples of a domestic fuel comprised of a 50–50 blend of straight run and catalytically cracked distillates, one sample containing additionally 50 parts per million of the sodium salt of the compound having the formula $RNHCH_2CH_2CH_2NHCH(CH_3)CH_2COOH$, wherein R is a mixture of radicals derived from tallow acids, were tested in the manner described in Example XI. The control sample had a filterability of 600 second/100 cc. and contained 64.5 mg. of insoluble sludge per liter of oil. The control sample had a filterability of 115 seconds/100 cc. and contained 1.0 mg. of insoluble sludge per liter of oil.

The test sample exhibited excellent emulsification characteristics.

After subjection to high temperature for 72 hours, the control sample exhibited heavy sludge formation and had a final NPA color of 3+ as opposed to an initial NPA color of 1+. The test sample exhibited no visual sludge formation and had a final color of 2— as opposed to an initial NPA color of 1+.

Example XIII

Two samples of a domestic fuel comprised of a 50–50 blend of straight run and catalytically cracked distillates, one sample containing additionally 50 parts per million of the calcium salt of the compound having the formula RNHCH₂CH₂CH₂NHCH(CH₃)CH₂COOH, wherein R is a mixture of radicals derived from soybean acids, were tested in the manner described in Example XI. The control sample had a filterability of more than 500 seconds/100 cc. and contained 59.0 mg. of insoluble sludge per liter of oil. The test sample had a filterability of 149 seconds/100 cc. and contained 20.5 mg. of insoluble sludge per liter of oil.

The test sample exhibited excellent emulsification characteristics.

After subjection to high temperature for a period of 72 hours, the control sample exhibited heavy visual sludge formation and had a final NPA color of 4+ as opposed to an initial NPA color of 1+. The test sample exhibited no visual sludge formation and had a final NPA color of 2½+ as opposed to an initial NPA color of 1+.

*Example XIV*

Two samples of a domestic fuel oil comprised of a 50–50 blend of straight run and catalytically cracked distillates, one sample containing additionally 50 parts per million of the secondary di-n-butyl amine salt of a compound having the formula

wherein R is a mixture of radicals derived from tallow acids, were subjected to a temperature of about 150° to 180° F., in vented containers, for a period of 72 hours. The control sample exhibited heavy visual sludge formation and had a final NPA color of 3+ as opposed to an initial NPA color of 1+. The test sample exhibited no visual sludge formation and had a final NPA color of 2 as opposed to an initial NPA color of 1+.

The test sample exhibited excellent emulsification characteristics which were determined in the manner described in Example XI.

*Example XV*

Two samples of a domestic fuel oil comprised of a 50–50 blend of straight run and catalytically cracked distillates, one sample containing additionally 100 parts per million of the N-tallow trimethylene diamine salt of the compound having the formula

wherein R is a mixture of radicals derived from tallow acids, were subjected to ultra-violet irradiation in an open vessel for a period of 7 hours, using nitrogen for purpose of agitation. The samples were then allowed to stand protected from light at room temperature for approximately 17 hours. The temperature of the oil during the ultra-violet irradiation was 115° F. The filterability of the oil was determined in the manner described in Example XI except that the time was measured for the flow of a 500 cc. sample through a 400-mesh screen having a spacing of 37 microns. The control sample had a filterability of 73.0 seconds per 500 cc. and contained 64.5 mg. of insoluble sludge per liter of oil. The test sample had a filterability of 68.2 seconds per 500 cc. and contained 28.5 mg. of insoluble sludge per liter of oil.

The test sample exhibited excellent emulsification characteristics when tested in the manner described in Example XI.

*Example XVI*

A series of samples comprised of a 50–50 blend of straight run and catalytically cracked distillates, one sample containing no additive and the remainder containing 50 parts per million of a chemical additive as hereinafter described were tested for corrosiveness in the following manner:

20 parts by weight of tap water and 180 parts by weight of the oil were mixed and poured over a number 10–20 sand-blasted mild steel coupon into an open container which was allowed to stand open to the air for one week at room temperature. At the end of this time the coupons were checked for rust spots and pitting.

The control sample exhibited severe rusting and pitting on the entire surface of the steel coupon.

The test sample containing 50 parts per million of a compound of a formula

wherein R is a mixture of radicals derived from soybean acids, exhibited no rusting or pitting of the steel coupon.

The test sample containing 50 parts per million of the secondary di-n-butyl amine salt of a compound having the formula

wherein R is a mixture of radicals derived from tallow acids, exhibited no rusting or pitting of the steel coupon.

The test sample containing 50 parts per million of the secondary di-coco amine salt of a compound having the formula

wherein R is a mixture of radicals derived from tallow acids, exhibited no rusting or pitting of the steel coupon.

The test sample containing 50 parts per million of the sodium salt compound having the formula

wherein R is a mixture of radicals derived from tallow acids, exhibited only slight rusting and no pitting of the steel coupon.

The test sample containing 50 parts per million of the calcium salt of a compound having the formula

wherein R is a mixture of radicals derived from tallow acids, exhibited no rusting and no pitting of the steel coupon.

While this invention has been described and exemplified in terms of its preferred embodiments, those skilled in the art will appreciate that modifications can be made without departing from the spirit and scope of the invention.

We claim:

1. As a new and useful composition of matter, a compound selected from the group consisting of: (I) a compound of the formula RNH(CH₂)₃NH—A—COOH, wherein A is a divalent hydrocarbon radical having from 2 to 3 carbon atoms, and R is a radical of the group consisting of (A) aliphatic hydrocarbon radicals having from 8 to 22 carbon atoms; and (B) hydrocarbon radicals as contained in rosin and tall oil acids; (II) an alkali metal salt of I; (III) an alkaline earth metal salt of I; (IV) a monoamine salt of I wherein the monoamine is one of the formulae RNH₂, R₂NH and R₃N, wherein R is a radical of the group consisting of aliphatic hydrocarbon radicals having from 1 to 22 carbon atoms and hydrocarbon radicals as contained in rosin and tall oil acids; (V) a diamine salt of I, wherein the diamine of the formula R′NH(CH₂)ₙNH₂, wherein R′ is of the group consisting of aliphatic hydrocarbon radicals having from 8 to 22 carbon atoms and hydrocarbon radicals as contained in rosin and tall oil acids, and $n$ is an integer of from 2 to 5; and (VI) a lower alkyl ester of I.

2. As a new and useful composition of matter, a compound having the formula RNH(CH₂)₃NH—A—COOH, wherein A is a divalent hydrocarbon radical having from 2 to 3 carbon atoms, and R is a radical of the group consisting of (A) aliphatic hydrocarbon radicals having from 8 to 22 carbon atoms, and (B) hydrocarbon radicals as contained in rosin and tall oil acids.

3. As a new and useful composition of matter, a compound having the formula RNH(CH₂)₃NH—A—COOH, wherein A is a divalent hydrocarbon radical having from 2 to 3 carbon atoms, and R is an aliphatic hydrocarbon radical having from 8 to 22 carbon atoms.

4. As a new and useful composition of matter, a compound represented by the formula

RNHCH$_2$CH$_2$CH$_2$NHCH(CH$_3$)CH$_2$COOH, wherein R is a mixture of hydrocarbon radicals as contained in tallow fatty acids.

5. As a new and useful composition of matter, an alkali metal salt of a compound represented by the formula RNH(CH$_2$)$_3$NH—A—COOH, wherein A is a divalent hydrocarbon radical having from 2 to 3 carbon atoms, and R is a radical of the group consisting of (A) aliphatic hydrocarbon radicals having from 8 to 22 carbon atoms, and (B) hydrocarbon radicals as contained in rosin and tall oil acids.

6. As a new and useful composition of matter, an alkali metal salt of a compound represented by the formula RNH(CH$_2$)$_3$NH—A—COOH, wherein A is a divalent hydrocarbon radical having from 2 to 3 carbon atoms, and R is an aliphatic hydrocarbon radical having from 8 to 22 carbon atoms.

7. As a new and useful composition of matter, the sodium salt of a compound having the formula

RNHCH$_2$CH$_2$CH$_2$NHCH(CH$_3$)CH$_2$COOH, wherein R is a mixture of hydrocarbon radicals as contained in tallow fatty acids.

8. As a new and useful composition of matter, an alkaline earth metal salt of a compound represented by the formula RNH(CH$_2$)$_3$NH—A—COOH, wherein A is a divalent hydrocarbon radical having from 2 to 3 carbon atoms, and R is a radical of the group consisting of (A) aliphatic hydrocarbon radicals having from 8 to 22 carbon atoms and (B) hydrocarbon radicals as contained in rosin and tall oil acids.

9. As a new and useful composition of matter, an alkaline earth metal salt of a compound represented by the formula RNH(CH$_2$)$_3$NH—A—COOH, wherein A is a divalent hydrocarbon radical having from 2 to 3 carbon atoms, and R is an aliphatic hydrocarbon radical having from 8 to 22 carbon atoms.

10. As a new and useful composition of matter, the calcium salt of a compound having the formula

RNHCH$_2$CH$_2$CH$_2$NHCH(CH$_3$)CH$_2$COOH wherein R is a mixture of hydrocarbon radicals as contained in tallow fatty acids.

11. As a new and useful composition of matter, the salt of a compound having the formula

RNH(CH$_2$)$_3$NH—A—COOH wherein A is a divalent hydrocarbon radical having from 2 to 3 carbon atoms, and R is a radical of the group consisting of (A) aliphatic hydrocarbon radicals having from 8 to 22 carbon atoms, and (B) hydrocarbon radicals as contained in rosin and tall oil acids, and a monoamine of the formulae RNH$_2$, R$_2$NH and R$_3$N, wherein R is of the group consisting of aliphatic hydrocarbon radicals having from 1 to 22 carbon atoms and hydrocarbon radicals as contained in rosin and tall oil acids.

12. As a new and useful composition of matter, the salt of a compound having the formula

RNH(CH$_2$)$_3$NH—A—COOH wherein A is a divalent hydrocarbon radical having from 2 to 3 carbon atoms, and R is an aliphatic hydrocarbon radical having from 8 to 22 carbon atoms, and a monoamine of the formulae RNH$_2$, R$_2$NH and R$_3$N, wherein R is an aliphatic hydrocarbon radical having from 1 to 22 carbon atoms.

13. As a new and useful composition of matter, the salt of secondary dicoco amine in a compound represented by the formula

RNHCH$_2$CH$_2$CH$_2$NHCH(CH$_3$)CH$_2$COOH wherein R is a mixture of hydrocarbon radicals as contained in tallow fatty acids.

14. As a new and useful composition of matter, the salt of a compound having the formula

RNH(CH$_2$)$_3$NH—A—COOH wherein A is a divalent hydrocarbon radical having from 2 to 3 carbon atoms, and R is a radical of the group consisting of (A) aliphatic hydrocarbon radicals having from 8 to 22 carbon atoms, and (B) hydrocarbon radicals as contained in rosin and tall oil acids, and a diamine of the formula RNH(CH$_2$)$_n$NH$_2$, wherein R is as hereinbefore defined and $n$ is an integer of from 2 to 5.

15. As a new and useful composition of matter, the salt of a compound represented by the formula

RNH(CH$_2$)$_3$NH—A—COOH wherein A is a divalent hydrocarbon radical having from 2 to 3 carbon atoms, and R is an aliphatic hydrocarbon radical having from 8 to 22 carbon atoms, and a diamine of the formula RNH(CH$_2$)$_n$NH$_2$, wherein R is as hereinbefore defined and $n$ is an integer of from 2 to 5.

16. As a new and useful composition of matter, the salt of a diamine having the formula

RNHCH$_2$CH$_2$CH$_2$NH$_2$ and an acid acid having the formula

RNHCH$_2$CH$_2$CH$_2$NHCH(CH$_3$)CH$_2$COOH wherein in each instance R is a mixture of radicals as contained in tallow fatty acids.

References Cited in the file of this patent

UNITED STATES PATENTS

| | | |
|---|---|---|
| 2,164,781 | Platz et al. | July 4, 1939 |
| 2,195,974 | Reppe et al. | Apr. 2, 1940 |
| 2,530,147 | Bersworth | Nov. 14, 1950 |
| 2,686,776 | Keim | Aug. 17, 1954 |
| 2,736,658 | Pfohl et al. | Feb. 28, 1956 |